J. LANG.
FOOD AND PLATTER HOLDER.
APPLICATION FILED FEB. 3, 1916.
1,201,061.
Patented Oct. 10, 1916.
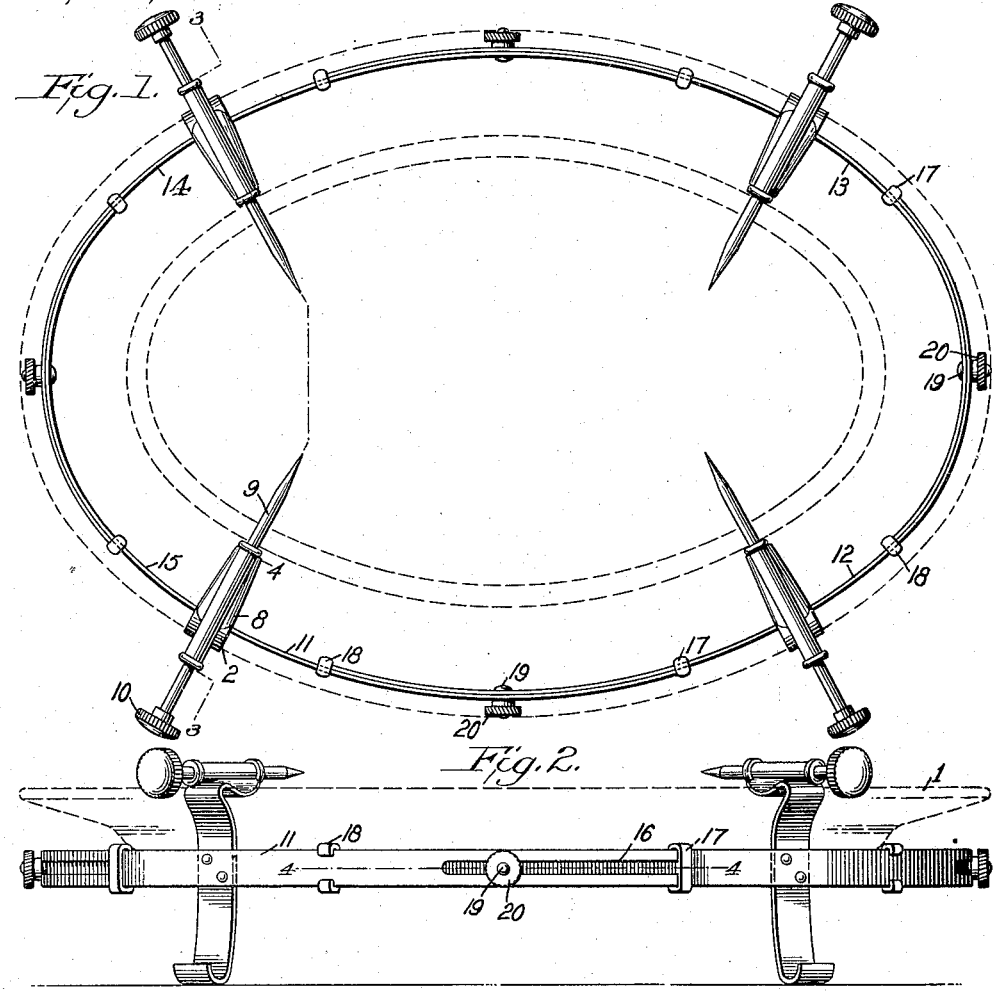
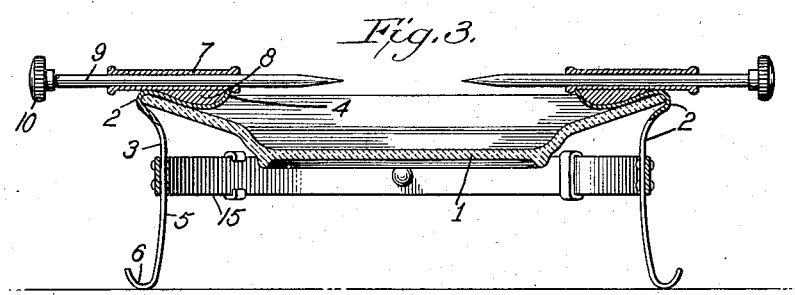
WITNESSES
Oliver W. Holmes
A. L. Kitchin
INVENTOR
Joseph Lang
BY
ATTORNEYS

UNITED STATES PATENT OFFICE.

JOSEPH LANG, OF MOUNT VERNON, NEW YORK.

FOOD AND PLATTER HOLDER.

1,201,061.  Specification of Letters Patent.  Patented Oct. 10, 1916.

Application filed February 3, 1916. Serial No. 76,023.

*To all whom it may concern:*

Be it known that I, JOSEPH LANG, a citizen of the United States, and a resident of Mount Vernon, in the county of Westchester and State of New York, have invented a new and Improved Food and Platter Holder, of which the following is a full, clear, and exact description.

This invention relates to holding devices for dishes and various articles to be placed thereon and particularly to an improved arrangement for holding a platter for meat, fowl and the like so that the same will not become accidentally displaced.

The object in view is to provide an improved, simple and strong construction for holding the platter against movement while holding the article on the platter against movement.

Another object in view is to provide an adjustable supporting member for a platter and the article thereon which will support the platter above the table and which, by its adjustability, will accommodate different sized platters and large or small articles of food.

A still further object in view is to provide a supporting member which may act in the single capacity of a support for a platter or act in the double capacity of a support for a platter and as retaining means for food on the platter.

In the accompanying drawings: Figure 1 is a top plan view of a holder embodying the invention. Fig. 2 is a side view of the structure shown in Fig. 1. Fig. 3 is a transverse sectional view through the structure shown in Fig. 1 the same being taken on line 3—3 thereof. Fig. 4 is a fragmentary sectional view through Fig. 2 on line 4—4.

Referring to the accompanying drawing by numerals, 1 indicates a platter of any desired kind which may support any desired article of food, as for instance, a piece of meat or fowl. The platter 1 is adapted to fit into the grooved socket portions 2 of the various legs 3, as more clearly shown in Fig. 3. The legs are of identical construction so that a description of one will equally apply to all. The various legs 3 are formed with not only the socket portion 2 but an extension 4, an upstanding section 5 and a foot or turned-up member 6. The extension 4 has a tube 7 arranged thereon and fastened thereto by any suitable means, as for instance, solder 8. Arranged in each of the tubes 7 is a pin 9 having, if desired, an ornamental head 10, whereby the various pins 9 are adapted to be easily inserted and removed. When in use the pins are first removed and the meat or other article of food is placed on the platter. The pins are then inserted into the tubes and forced a short distance into the article of food, whereby the article of food is clamped against independent movement.

In order to hold the various legs 3 in position the same are supported by a bracing band 11 which is divided into sections 12, 13, 14 and 15. Each of these sections is provided with a slot 16 at one end and a pair of turned-over ears 17 at the same end, while at the opposite end, each of the sections is provided with similar turned-over ears 18. In addition each section is provided with a bolt 19 having a nut 20, said bolt on one section being adapted to pass through the slot 16 on the next adjacent section, as clearly shown in Figs. 2 and 4. By arranging the sections, as shown more particularly in Fig. 2, there is an adjusting portion at each end of the device and one at each side, whereby the parts may be adjusted for accommodating a long narrow platter, or a comparatively short wide platter.

It is evident that the device may be made of any suitable material and that various changes and rearrangements of the parts may be provided without departing from the spirit of the invention, provided some form of socket construction is supplied, together with means for adjusting the device so as to fit different platters and also means for clamping or holding an article of food on the platter.

What I claim is:—

1. In a device of the character described, a plurality of supports for holding a platter, means for holding the supports in a given position, and means for clamping an article of food on said platter.

2. In a holder for a platter or the like, a plurality of supporting legs having sockets for receiving the edge of the platter at different points, adjustable means connected with said legs for holding the same in proper position to fit any particular sized platter, and means connected with said legs for holding an article of food in position on said platter.

3. In a device of the character described, a plurality of supporting members having sockets for receiving a platter, and means connected with said supports for rigidly holding the same in a given position, said means having adjustable sections between said supports, whereby the supports may be adjusted in any direction for accommodating different shaped platters.

4. In a device of the character described, a plurality of supports, each of said supports being formed with a socket, said sockets accommodating the edges of a platter whereby the platter is supported, a comparatively flexible metallic strip rigidly connected with each of said supports, and means engaging the contacting portions of said strip for clamping the same together in any adjusted position, whereby the supports are held in position for supporting a large or small platter as desired.

5. In a device of the character described, a plurality of supports formed with sockets for receiving the edge of a platter, whereby the platter is supported, means for holding said supports against independent movement, a guiding member arranged on each of said supports, and a pin extending through each of said guiding members, said pins being adapted to be thrust into an article of food for holding the same on said platter.

6. In a device of the character described, a plurality of supports adapted to engage and support a platter, means for holding said supports against independent movement, a plurality of guiding members supported by said supports, and a pin in each of said guiding members, said pins being adapted to be thrust into an article of food on the platter, so as to prevent the accidental removal of said article of food from the platter.

7. In a device of the character described, a plurality of platter supporting members, a bracing strip connected rigidly with each of said supporting members, each of said strips being formed with a slot and overhanging pair of members at each end, said overhanging members being adapted to extend over the next adjacent strip, and a clamping member extending through each of the slots and engaging the next adjacent strip for clamping the next adjacent strip against movement, said clamping members being adapted to be movable longitudinally of said slots for adjusting the position of said supports, whereby the supports may be caused to engage platters of different sizes, and means arranged on said supports adapted to engage an article of food on the platter for holding the same against accidental removal.

In testimony whereof I have signed my name to this specification in the presence of two subscribing witnesses.

JOSEPH LANG.

Witnesses:
Joseph H. Mandlebaum,
Charles C. Wientge.